Nov. 8, 1949   E. A. ANDERSON   2,487,508
PORTABLE HYDRAULIC LIFT
Filed Jan. 29, 1948   2 Sheets-Sheet 1

INVENTOR.
Emil A. Anderson
BY Victor J. Evans & Co.
ATTORNEYS

Nov. 8, 1949
E. A. ANDERSON
2,487,508
PORTABLE HYDRAULIC LIFT
Filed Jan. 29, 1948
2 Sheets-Sheet 2
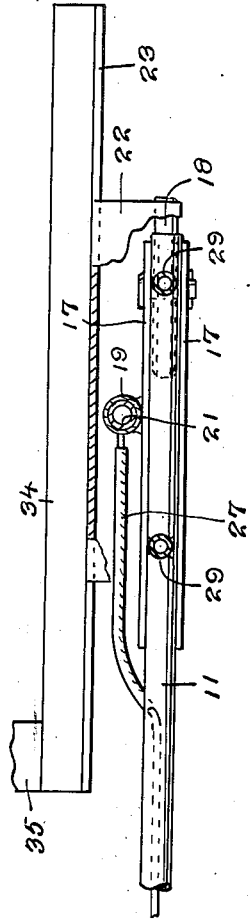
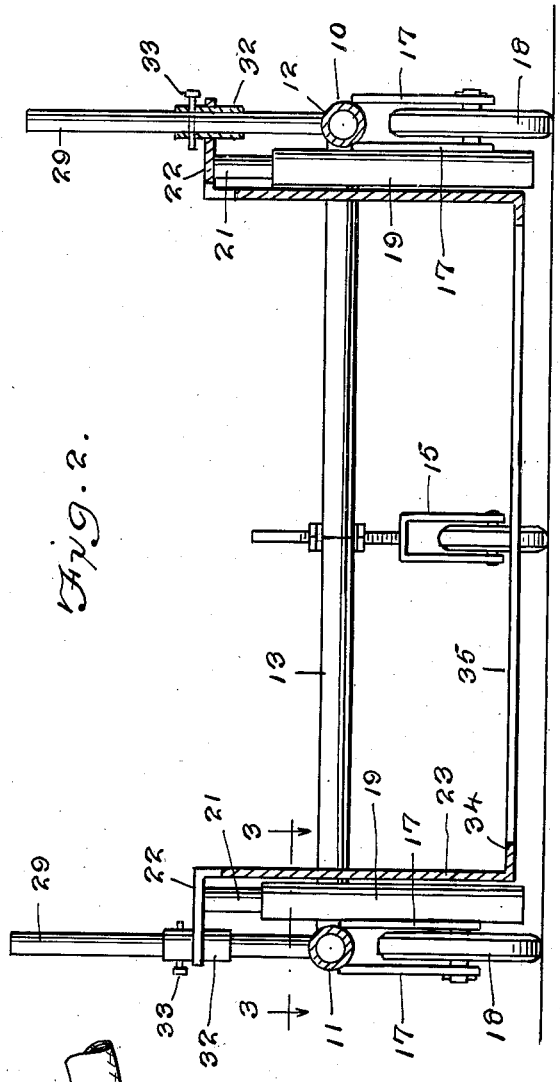
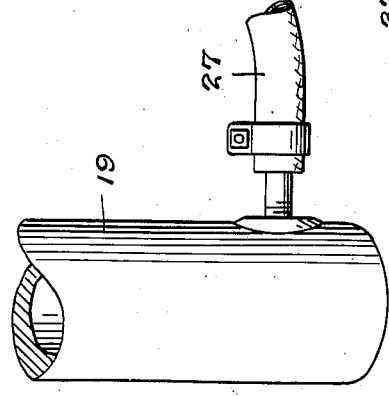
INVENTOR.
Emil A. Anderson
BY Victor J. Evans & Co.
ATTORNEYS Patented Nov. 8, 1949

2,487,508

UNITED STATES PATENT OFFICE 2,487,508

PORTABLE HYDRAULIC LIFT

Emil A. Anderson, Ludington, Mich.

Application January 29, 1948, Serial No. 5,130

2 Claims. (Cl. 254—2)

1

This invention relates to a portable hydraulic lift.

It is an object of the present invention to provide a portable lift particularly adapted to be used to lift large oil drums, barrels, household appliances, furniture and other heavy items from a ground level to a truck or wagon floor level whereby to permit one man to load heavy items from the ground to a truck.

It is another object of the present invention to provide an automobile trailer or farm implement which has a loading platform adapted to be raised from a ground level to an elevated position for the purpose of transport of heavy items.

Other objects of the present invention are to provide a portable hydraulic lift or trailer which is of simple construction, inexpensive to manufacture and efficient in operation.

For other objects and for a better understanding of the invention, reference may be had to the following detailed description taken in connection with the accompanying drawing, in which Fig. 1 is a perspective view of the hydraulic trailer lift embodying the features of the present invention.

Fig. 2 is a transverse cross-sectional view taken on line 2—2 of Fig. 1.

Fig. 3 is a fragmentary and cross-sectional view taken on line 3—3 of Fig. 2.

Fig. 4 is an enlarged fragmentary perspective view showing the hose connection to the hydraulic cylinder.

Figure 1:
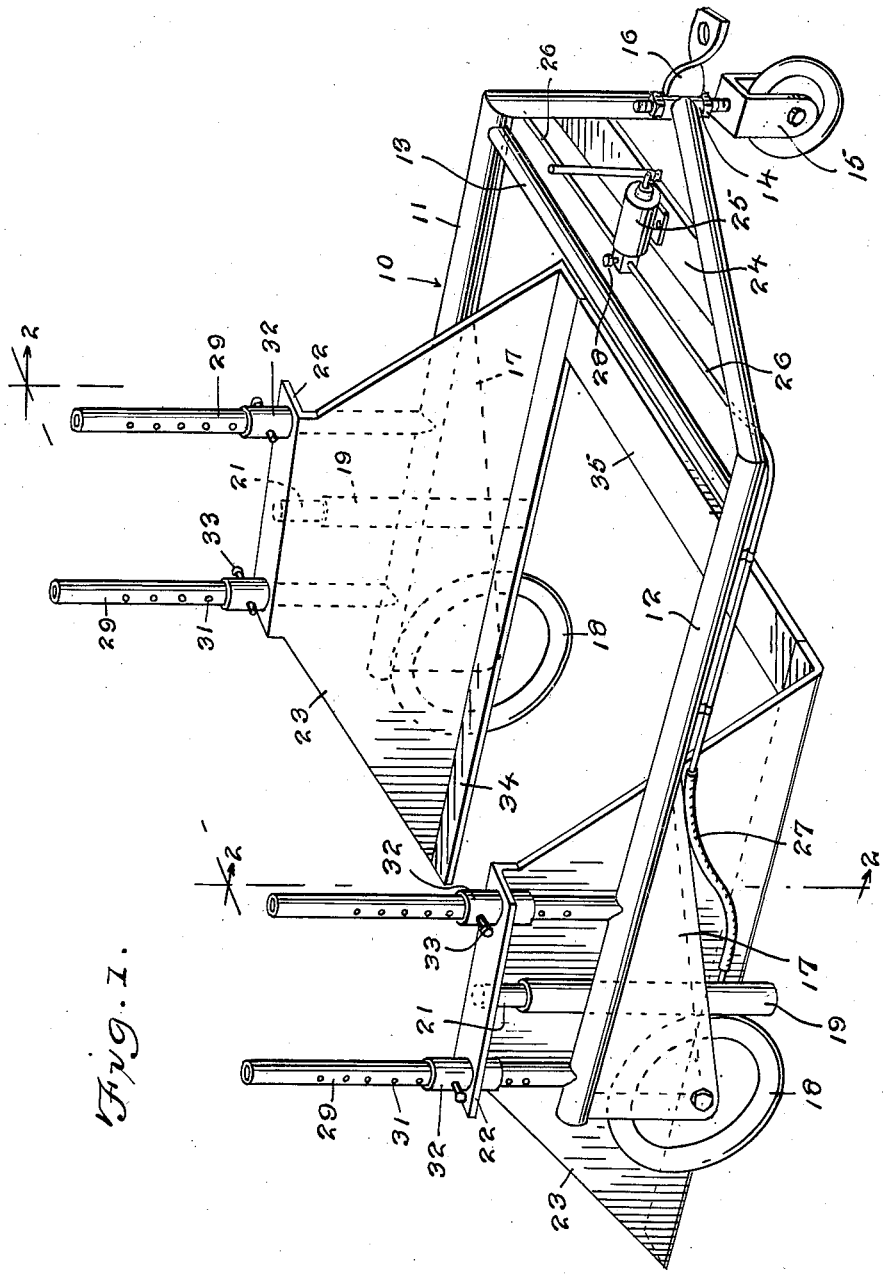

Referring now to the figures, 10 represents a main supporting frame generally of U shape having side members 11 and 12 and a forward tie member 13 extending between them. The forward ends of the side members 11 and 12 converge to provide a hitch point 14 which is supported on a caster wheel 15. A hitch member 16 extends forwardly for connecting the frame to an automobile, tractor or the like to pull the lift about. Extending downwardly from each of the side members 11 and 12 at their rear ends are laterally spaced plates 17 to the lower ends of which there is connected a supporting wheel 18.

To the inner plate 17 there is welded or otherwise secured, fluid-operated jacks 19 having a piston 21 adapted to be extended upwardly for engagement with an outwardly turned flange 22 of a lifting platform 23. Between the converged ends of the side members 11 and 12 is a supporting piece 24 on which is mounted a hand pump 25. Pipes 26 and flexible hose connections 27 extend from opposite sides of the pump 25 and along the side frame pieces 11 and 12 for connection with the fluid-operated jacks. The pump may store fluid when the jacks have been retracted. To return the jacks after they have been extended, a by-pass valve 28 may be opened.

Extending upwardly from each of the side members 11 and 12 at their rear ends, and spaced

2 from one another are guide posts 29 having a series of holes 31 therein. The laterally extending flanges 22 have sleeves 32 fixed to them which will provide a large bearing surface to slide on the posts as the platform 23 is raised and lowered. At times of transport, retaining pins 33 may be extended into any of the holes 31 whereby to positively retain the platform in its adjusted positions.

Platform 23 may be made open at the rear end and be provided at its sides with inwardly extending shelves 34 at opposite sides of the platform and the sides of the platform connected together only at their forward ends by a transversely extending member 35. With the platform open at the rear, the same can be extended more readily beneath heavy articles or items to be carried by the lift. If desired, boards can be extended between the inwardly extending portions 34 to close the space therebetween and provide added rests for the articles being transported.

Having thus described my invention, I claim:

1. In a portable hydraulic lift, ground engaging wheels, a horizontally disposed frame supported by said wheels and including a pair of spaced parallel side members, a pair of spaced parallel hydraulic jacks carried by said frame, a vertically adjustable piston mounted in each of said jacks, a platform extending between said jacks, said platform including a pair of horizontally disposed flanges arranged in engagement with said pistons whereby actuation of said jacks causes vertical adjustment of said platform, a pair of spaced parallel, vertically disposed guide posts projecting upwardly from each of said side members, a sleeve arranged in sliding embracing relation with respect to each of said guide posts and secured to said flanges, there being a plurality of vertically spaced holes in each of said guide posts, and a pin carried by each of said sleeves and adapted to project into one of the holes in said posts for maintaining said platform immobile in its adjusted positions.

2. The apparatus as described in claim 1 and further including a hitch member connected to the front of said frame for attaching said lift to a towing vehicle.

EMIL A. ANDERSON.

REFERENCES CITED

The following references are of record in the file of this patent:

UNITED STATES PATENTS

| Number | Name | Date |
|---|---|---|
| 783,699 | Laffin | Feb. 28, 1905 |
| 1,414,163 | Anthony | Apr. 25, 1922 |
| 1,484,265 | Hird et al. | Feb. 19, 1924 |
| 2,300,796 | McGregor | Nov. 3, 1942 |
| 2,357,633 | Cowgill | Sept. 5, 1944 |